Figure 1:
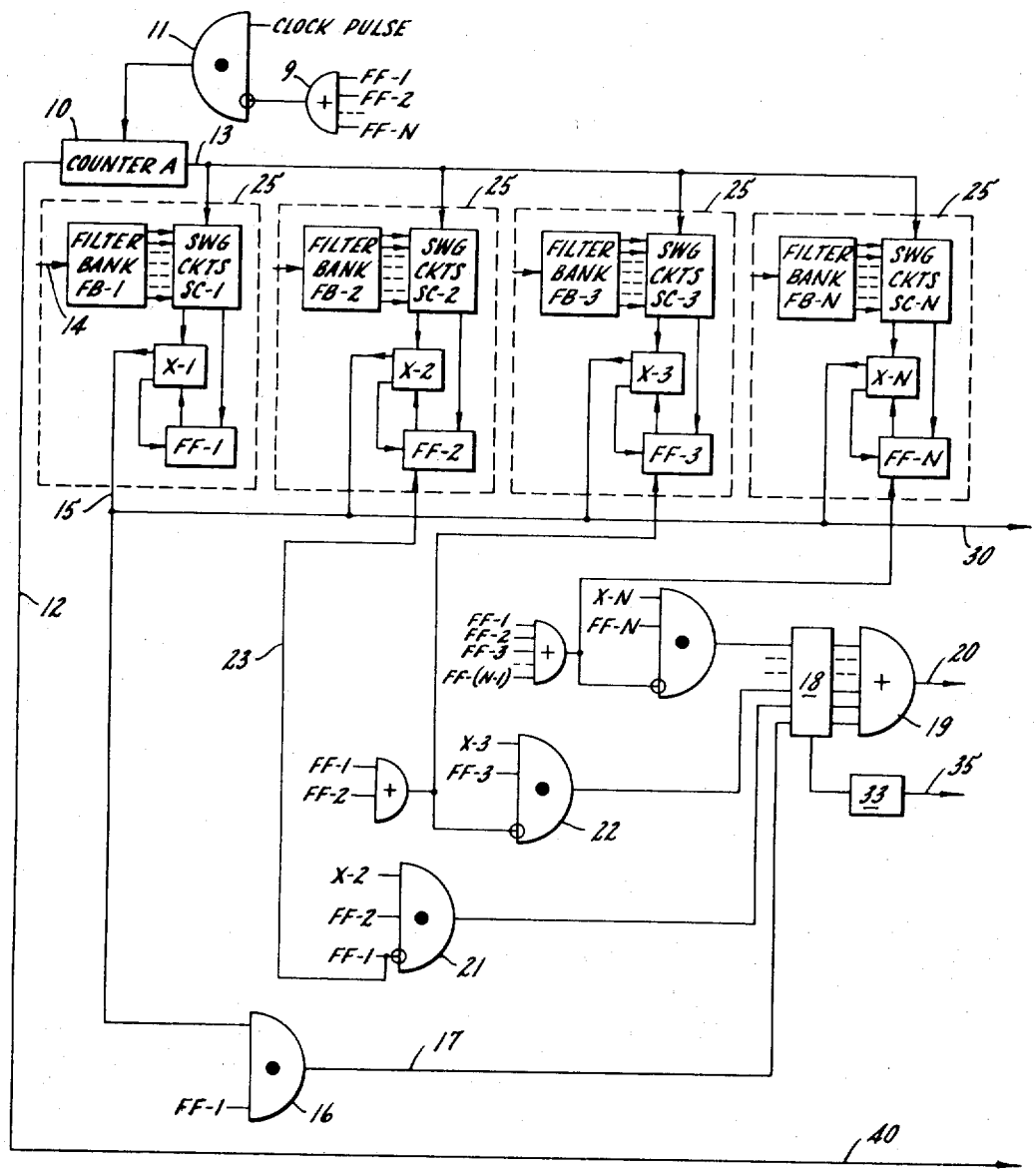

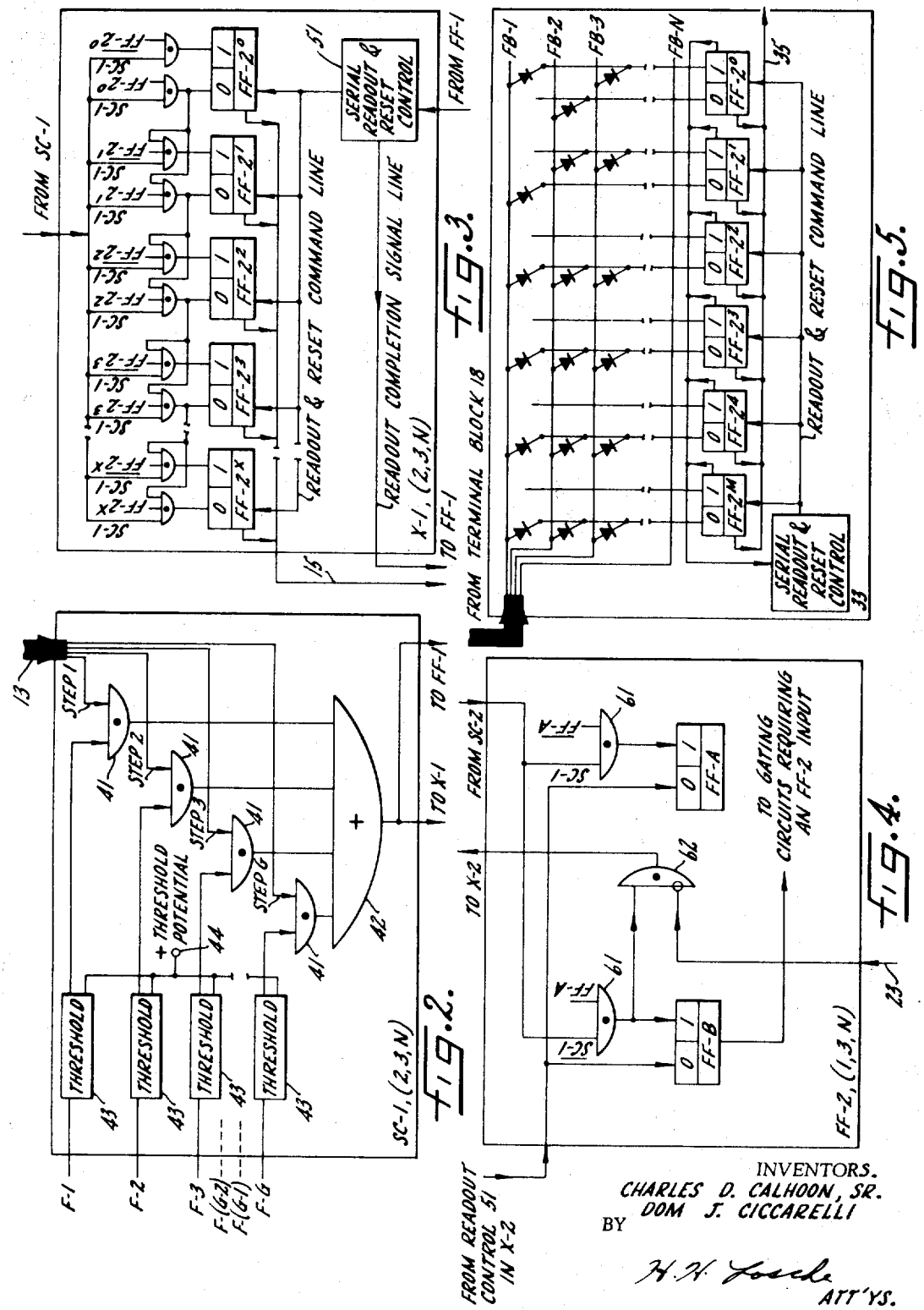

_United States Patent Office_

3,444,557
Patented May 13, 1969

3,444,557
PULSE DOPPLER FILTER BANK INTERROGATION SCHEME
Charles D. Calhoon, Sr., Catonsville, Md., and Dom J. Ciccarelli, Irwin, Pa., assignors, by mesne assignments, to the United States of America as represented by the Secretary of the Navy
Continuation-in-part of application Ser. No. 13,384, Mar. 7, 1960. This application Dec. 12, 1962, Ser. No. 244,226
Int. Cl. G01s 9/44; H04q
U.S. Cl. 343—8   10 Claims This invention relates generally to pulse Doppler radar and more particularly to interrogation of banks of filters which are associated with pulse Doppler radar receiving systems.

This application is a continuation-in-part of our parent application Ser. No. 13,384, filed Mar. 7, 1960, now abandoned, for Pulse Doppler Filter Bank Interrogation Scheme.

Pulse Doppler radar is useful particularly to determine the relative velocity between an aircraft carrying a radar transmitter-receiver and an object or target which is intercepted by the transmitted radar beam and which reflects energy to the radar receiver. The pulse Doppler radar is also advantageous in that it makes possible the determination of the range between the aircraft and the target, as well as the relative velocity. By use of beam splitting and variations of scanning patterns the location in azimuth and elevation of the target from the aircraft may also be determined. In the past, in order to determine the velocity and range of a target intercepted by the radar beam, a number of bandpass filters responsive to different frequencies have been used to identify the velocity represented by the Doppler frequency of the received signals. It has also been necessary to utilize a number of separate banks of filters for various reasons and more recently to determine target elevation. Consequently, it has not only been necessary to determine which filter has a signal passing through it but also which bank the filter is in. This has normally been accomplished by sampling the filters one at a time. To do so has required as many separate sampling steps as there have been filters. In some radar applications many filters are required to obtain the information desired. Sampling then by conventional methods requires excessive time.

The present invention makes possible a marked reduction in the time required to determine which filters contain signficant informaton. This is accomplshed by applying a counter circuit to each bank of filters and controlling the counting activity of all counters simultaneously by a single master counter which steps through a number of states equal to the number of filters in each bank. When any filter in a bank has a signal in it exceeding a threshold or reference voltage level and the next adjacent filter does not exceed the theshold, advance of the master counter is inhibited and a readout is made of the contents of the counter associated with the filter bank. If at the same time a filter in another bank and representative of a corresponding velocity, exceeds the threshold or reference voltage and the next subsequent filter does not, readout will be made by the counter associated with said another bank immediately after readout of the counter associated with the first filter bank. Where adjacent filters within a bank exceed the threshold, readout from the counter for that bank is made only when the next succeeding filter does not exceed the threshold. In this case the number in the master counter together with the count in the counter associated with the filters exceeding the threshold are produced in outputs of the circuit of our invention so that radar computing circuitry to which this invention is connected but which is not part of this invention can determine the average velocity represented by the filters exceeding the threshold. At the same time additional information representative of the bank number is also available at the output.

Accordingly, it is a general object of the present invention to permit a rapid sampling rate of filters and it is a more specific object of the present invention to permit a consecutive group of filters within a bank of filters to be treated as a single entry. Other objects, advantages, and uses of this invention will be readily apparent when the description thereof is read and reference is made to the figures of drawing which show a preferred embodiment of this invention in which FIGURE 1 is a logical block diagram of the invention, and FIGURES 2, 3, 4, and 5 disclose representative embodiments in logical schematic form of various blocks shown in FIGURE 1.

Referring to FIGURE 1 there is shown a master counter A, indicated by reference character 10, which is synchronized with other components of a radar system (not shown) by a clock pulse entering a circuit, which circuit is indicated by reference character 11 and which may be an inhibit circuit. The inhibit terminal of gate 11 is coupled to the output terminal of an OR gate 9 having various inputs whereby a "one" signal on any of these inputs will be passed to the inhibit terminal of gate 11 causing it to block all clock pulses to counter A until all such inputs to gate 9 have been restored to a "zero" state. Counter A may be selected from the many available types of digital counters known to those skilled in the art. Counter A has two outputs, a first being represented by reference character 12 by means of which the number in the counter is available at terminal 40. A second output of counter A represented by reference character 13 is connected to the switching circuits of each of the filter banks which as required obtain the desired radar information. The switching circuit SC–1, an embodiment of which is shown in logical schematic form in FIGURE 2, is connected to filter bank FB–1. Filter bank FB–1 has in it a number of filters which could be designated from 1 to G, G being the total number of filters in the bank. A signal representing Doppler frequency enters FB–1 at the input 14. Switching circuits SC–1 are required for filter bank FB–1 so that counter A which is advanced by clock pulses entering the inhibit circuit 11 will make possible the sampling of each filter in the filter bank FB–1 from the first filter to the G filter in synchronism with the advance of counter A through G steps from 1 to G. There is a counter X–1, a suitable embodiment of which is shown in FIGURE 3, coupled to the switching circuit SC–1 which counter is advanced one each time the switching circuit connected to counter X–1 is connected to a filter in filter bank FB–1 in which there is a signal which exceeds an adjustable threshold potential in the switching circuits. Readout control flip-flop circuit FF–1, an embodiment of which is shown in FIGURE 4, is connected to the switch circuit SC–1 and to counter X–1 so that when one or more adjacent filters within a bank are passing signals above the threshold, and a subsequent filter produces no signal above the threshold or reference voltage, the number in counter X–1 will be read out as counter A reaches that step, the readout being taken from output 15 and produced at output terminal 30. Output 15 is further connected to an AND circuit 16 which also has an input from readout control flip-flop circuit FF–1. AND circuit 16 is connected through a coupling means 17 to a junction block 18 and to OR circuit 19. Junction block 18 provides an input from the gating circuits 16, 21, 22, etc., to bank number logic circuit 33, a suitable embodiment of which is shown in FIGURE 5 and which produces an output at terminal 35 as will be explained hereinafter.

OR circuit 19 has an output 20 on which is available useful information for a radar system (not shown) with which this invention may be used. Any number of filter banks and associated switching circuits may be used in the system though only four are shown in the drawing. All four are designated by reference character 25 to denote similarity. FIGURE 1 also shows the last filter bank and switching circuits which are designated as FB–N and SC–N respectively, where N represents the number of filter banks to be interrogated according to the invention. Each of the filter banks and switching circuits and their associated counters and readout control flip-flops may be substantially identical. However, all switching circuits are operated simultaneously by counter A as it advances through G steps.

AND circuit 16 has already been mentioned. Each filter bank and switching circuit except the first has associated with it, an inhibit circuit, but the various inhibit circuits differ from one another in that the circuits toward the last filter bank FB–N have more inputs to their respective associated OR gate than the previous ones. For example, inhibit circuit 21 which would be associated with filter bank FB–2 (not shown in detail) has an input from the counter X–2, from readout control flip-flop FF–1, and from readout control flip-flop FF–2, the last flip-flop being associated with filter bank FB–2, as is the counter X–2. Inhibit circuit 22 has inputs from counter X–3, and readout control flip-flops FF–1, FF–2, and FF–3. The reason for these differences between the inputs to the inhibit circuit associated with each of the various filter banks will be explained.

FIGURE 2 depicts in logical schematic form a suitable embodiment of switching circuits SC–1 (also may represent SC–2, SC–3, or SC–N) shown in block diagram form in FIGURE 1. Elements 41 are ordinary two-input AND gates and element 42 is a multiple input OR gate, all of which are well-known in the art. Block 43 is a threshold or voltage comparing circuit which provides a signal of a first constant level to its following gate circuit 41 to represent a ONE input thereto so long as the input voltage from its associated filter (F–1, F–2, etc.) remains above the threshold or reference potential 44. When the input filter voltage drops below adjustable threshold potential 44, the associated threshold circuit 43 provides an output at a second lower level to represent a ZERO to its following gate circuit 41. Theshold circuit 43 may be any suitable voltage comparing circuit, many of which are well-known in the art. For example, see the schmitt trigger circuit shown as FIGURE 20, Chapter 16, page 468 of *Reference Data for Radio Engineers*, published by International Telephone and Telegraph Corporation, Fourth Edition, 1956.

FIGURE 3 shows in logical schematic form an embodiment of counter X–1 (also may represent X–2, X–3, or X–N) shown in block form in FIGURE 1. All gating circuits shown in this figure are common multiple input AND gates which provide an output only upon simultaneous occurrence of all specified inputs; the FF–2⁰ through FF–2ˣ circuits are common bistable flip-flop circuits of the type well-known in the art. Element 51 may be any serial readout and reset control common in the art, which upon receiving a readout pulse from flip-flop circuit FF–1 serially pulses flip-flops FF–2⁰ through FF–2ˣ causing their contents to be transferred to line 15 forming a binary number representing the total decimal value of successive pulses received from switching circuit SC–1, and upon completion of readout, resets these flip-flops to zero and sends a completion-reset signal to flip-flop control circuit FF–1.

In FIGURE 4 is shown a representative embodiment of flip-flop control circuit FF–2, which is depicted in block form in FIGURE 1. Elements 61 are common two-input AND gates and element 62 is a common inhibit circuit which provides an output when there is a ONE present on its unmarked terminaly only if there is no input on its inhibit terminal, i.e., a ZERO on line 23. Elements FF–A and FF–B are common bistable flip-flop circuits and are reset by a completion signal from readout control 51.

FIGURE 5 depicts an embodiment of bank number logic circuit 33 shown in block form in FIGURE 1. Circuit 33 is a diode matrix switch of a type common in the art which upon receiving a pulse on a line from any of the filter banks FB–1 and FB–N via terminal block 18, sets common bistable flip-flop circuits FF–2⁰ to FF–2ᵐ in such a manner that when serially read out, the number of the bank from which the pulse originated is presented in binary form at output terminal 35.

*Operation*

The operation of the invention will be more readily understood by associating it with an environment in which it may be found and in which it is particularly useful but which environment constitutes no part of this invention. It is well-known that in military aircraft it is desirable to determine both the azimuth and elevation of a target sighted by its radar apparatus. While this is normally achieved by selecting various scanning patterns and moving the radar antenna accordingly, various systems have been devised whereby movement of the antenna is minimized. To make possible such systems and also to utilize high pulse repetition frequencies with Doppler radar, it has proved advantageous to incorporate a number of separate banks of bandpass filters from which useful radar information is obtained.

Pulse Doppler radar equipment feeds range gated Doppler information to the filter banks. In order to utilize such available information most effectively it is necessary to survey or sample each individual filter as rapidly as possible and to survey the entire complement of filters in all banks as readily as possible. According to this invention, filters representing corresponding velocities are sampled in all the banks simultaneously, or in parallel. The filters representing the various different velocities are sampled sequentially. The sequential sampling of the filters is controlled by a clock pulse which enters the inhibit circuit 11 producing an output to master counter A causing it to advance one step, providing that none of the inputs to OR gate 9 contain a ONE signal, which would pass to the inhibit terminal of gate 11 and thereby block the clock pulse. As counter A advances one, it produces an output at 13 which is coupled to the switching circuit associated with each filter bank. While these witching circuit may be of any conventional type, an embodiment suitable for performing the desired switching function is shown in FIGURE 2. After counter A advances one, if the first filter in filter bank FB–1 exceeds the threshold or reference potential, the counter X–1 is advanced one counter state. Accordingly, as counter A steps through each state up to a number of states which equals the maximum number of filters in a bank which, for example, we will represent as G, each filter having a signal in it above the threshold potential advances the counter state of counter X–1 by one. The first subsequent filter which follows a single filter or a group of adjacent filters above the threshold potential which subsequent filter does not exceed the threshold potential, causes flip-flop FF–B of the readout control flip-flop circuit FF–1 to advance to the ONE state. When the flip-flop FF–B of readout control flip-flop circuit FF–1 is in the ONE state, it produces a ONE output via OR gate 9 to the inhibit circuit 11, so advance of counter A is stopped even if a clock pulse should appear. When flip-flop FF–A of readout flip-flop circuit FF–1 is in the ONE state and a ZERO or $\overline{SC–1}$ signal is present on the input line from switching circuit SC–1, a readout signal is sent to readout control 51 of counter X–1 (in circuits FF–2 through FF–N this readout signal must pass through an inhibit gate 62 which will permit its immediate passage only if no previous circuit is in a readout condition at that time, as shown in FIGURE 4) causing readout of the number in counter X–1 to occur, which readout appearing on output 15 is connected to output terminal 30 where it represents the number of adjacent filters above the threshold potential at the time the advance of counter A stops. This information is useful in the subsequent radar circuitry to determine the average velocity of the target as represented by the adjacent filters activated above the threshold potential. The readout of counter X–1 also provides an input to AND gate 16 which, if conditioned by a ONE input from flip-flop circuit FF–1, produces an output at 17 for purposes which will be explained hereinafter. When the readout of X–1 counter has been accomplished the X–1 counter is reset to the ZERO state by readout and reset control 51 (see FIGURE 3) which also provides a completion reset signal to readout control flip-flop circuit FF–1 whereby it is reset to the ZERO state at which time the output at 17 from AND gate 16 disappears. If it happens that a flip-flop FF–B (see FIGURE 4) in the readout control flip-flop circuit of any of the other filter banks is in the ONE state at the same time that another, such as that in FF–1, for example, is in the ONE state, advance of counter A will be inhibited until all of these readout flip-flop circuits have been reset to the ZERO state. Accordingly, it will be apparent that each counter which is associated with a readout control flip-flop circuit having an FF–B flip-flop in the ONE state, will be read out before counter A continues to advance. It should be noted at this point that when more than one such flip-flop is in the ONE state at the same time, readouts will be accomplished in succession from the first to the last of those which are in the ONE state. This succession of readouts may be accomplished in any of the ways well-known in the art for reading out information from registers sequentially, a suitable embodiment being shown in FIGURES 3 and 4. However, in this invention the input signals to the inhibit terminals of the inhibit circuits associated with each filter bank except the first such as circuits 21, 22, 62, et cetera, perform a key function by preventing readout of their respective counters until counters having numbers in them which should be read out first, have been read out. How these input inhibit signals can accomplish this will become more apparent as the description proceeds. Accordingly, it is seen that when the counter A is in a state where it is interrogating one group of filters the readout from the corresponding filters in all banks is accomplished simultaneously and accordingly, the time for readout is reduced by a factor of N, where N corresponds to the total number of filter banks being interrogated. As soon as all the FF–B readout flip-flops which were in the ONE state at the same time have been reset to zero, counter A is again rendered active and continues the steps through the remaining states up to G until such time as another FF–B readout control flip-flop is in the ONE state. At this time, as before noted, the advance of the counter A is again inhibited, and readout and reset of the counter associated with the ONE state readout control flip-flop is accomplished.

To explain more clearly the purpose of the gating circuits such as 16, 21, and 22, the AND circuit 16, for example, will produce an output only when there is a number in counter X–1 and the FF–B readout control flip-flop of control circuit FF–1 is in the ONE state. Similarly, inhibit circuit 21 will only produce an output when there is a number in counter X–2, the FF–1 readout control flip-flop input signal to the inhibit terminal of circuit 21 is in the ZERO state, and readout control flip-flop FF–2 is in the ONE state. Inhibit circuit 22 can produce an output only when counter X–3 has a number in it, the input signals from readout control flip-flop FF–1 and readout control flip-flop FF–2 are in the ZERO state, and the input signal from readout control flip-flop FF–3 is in the ONE state. It will be apparent then, that if the input signal present at the inhibit terminal of an inhibit circuit such as 21, for example, is connected to an inhibit gate 62 (see FIGURE 4) of the readout control flip-flop circuit FF–2 as by conductor 23, it can prevent readout of counter X–2 until counter X–1 has been read out and reset and the input to the inhibit terminal of gates 21 and 62 from readout control flip-flop circuit FF–1 has been reset to the ZERO state. In this manner, readout of counters having readout control flip-flop circuits in the ONE state simultaneously can be effected in a sequence in the direction from the first bank toward the N bank.

The outputs of the inhibit and gate circuits such as 16, 21, 22, et cetera, are connected to junction block 18. This signal at junction block 18 has a twofold purpose, the first of which is described presently. The signal is applied to a bank number logic circuit 33 (see FIGURE 5 for a detailed schematic logical embodiment) which produces an output representative of the bank number from which the count at terminal 30 is obtained. The bank number output is available at terminal 35 for utilization in the radar where it is useful to determine elevation of a target having a velocity with respect to the aircraft, determinable from the outputs at terminals 30 and 40. The operation of the inhibit circuits, as noted above, prevents an output to the junction block 18 from any inhibit circuit which is associated wtih a filter bank following one which has a count that should have been read out first. This arrangement avoids any possibility of misindexing between the readout of a counter such as X–1, X–2, X–3, and the bank number logic circuit output which represents the filter bank from which the readout was obtained. The second purpose of junction block 18 is to receive output signals from the inhibit and gate circuits 16, 21, 22, and all other inhibit circuits associated with the filter banks and pass them to the OR circuit 19 so that at the time that useful information is being read out of a filter bank, there is an output from the OR circuit at terminal 20. The OR circuit output is useful in the radar system with which our invention is associated, for such purposes as maintenance of the Doppler filter banks as the source of tracking information rather than some other source of information, as long as the filter banks remain uncluttered from such as jamming signals. As soon as counter A has advanced through G steps, it returns to its original state to begin a repeat of its advance through the G steps.

While this description is related to a preferred embodiment of this invention in a certain environment, it should be clear that other embodiments and applications may also be found which would be within the scope of this invention and accordingly, we wish the scope to be limited only by the appended claims.

We claim:
1. A filter bank interrogation system comprising:
a first finite number of filter banks, each bank containing a second finite number of filters;
a separate counting means and control circuitry therefor associated with each bank of filters;
a master counter associated with the filter banks to synchronize sampling of filters and maintain a count;
circuit means coupled to said master counter to control its operation;
a separate circuit means coupled to each said separate counting means and to an OR circuit, said OR circuit to produce an output from said system, and said separate circuit means to produce a signal to said seperate counting means to effect readout of the said separate counting means at the correct time;
means coupled to said separate circuit means for producing an output representative of the bank whose separate counting means is being read out; and
output means coupled to said separate counting means.
2. A filter bank interrogation system as set forth in claim 1 wherein said control circuitry includes switching circuit gating means between the filter bank and the separate counting means associated therewith, and a readout control coupled between said switching circuit gating means and said counting means.
3. A filter bank interrogation system comprising:

a number of banks of filters, each of said banks having therein a number of bandpass filters;

means coupled to said filters for registering significant information from said filters;

means for controlling coupling means said means for controlling being coupled to a source of timing signals and to said coupling means to cause controlled sequential coupling of said filters to said means for registering;

means coupled to said means for controlling and to said means for registering, to properly time and control prevention and permission of removal to a first output, of information in said means for registering;

means coupled to said means for registering, for providing signals to said means to properly time and control, whereby operation of said means to properly time and control is caused to follow a predetermined order, said means for providing signals also being coupled to a second output for information representative of the means for registering from which information is removed; and means coupling said means for providing a signal to a third output, whereby a signal is produced at all times when information is removed from any of said means for registering.

4. The filter bank interrogation system of claim 3 wherein said means for controlling includes counting circuitry to produce an output representative of position in a sequence.

5. A filter bank interrogation system comprising:

N filter banks where N is any integer;

filters in each of N filter banks;

switching circuit gating means coupled to each filter bank;

a computer coupled to each said switching circuit gating means;

a computer control switch coupled to each computer;

a master control computer coupled to a source of timing signals and to each said switching circuit gating means to synchronize said switching circuit gating means and to maintain a count representative of the status of said switching circuit gating means;

a master control computer control circuit coupled to said master control computer to properly control advance of said master control computer;

a computer control switch co-ordinator coupled to each computer and to each computer control switch to prevent simultaneous readout of computers;

circuitry coupled to said co-ordinators to produce, at the time a computer is read out, information representing the computer from which readout is being made; and circuit means coupled to each said co-ordinator to produce an output whenever there is readout of any computer.

6. The system in claim 5 wherein the co-ordinator for the first of said filter banks has input circuitry from the computer and computer control switch for said first bank;

the co-ordinator for the second of said filter banks has inputs from the computer and computer control switch for said second bank and from the computer control switch for said first bank;

the co-ordinator for (N−1) banks has inputs from the computer and computer control switch for N−1 bank and from the computer control switches of all preceding banks from the first to the (N−1) bank; and the co-ordinator for N bank has inputs from the computer and computer control switch for the N bank and inputs from the computer control switches of all preceding banks from the first to the N bank.

7. The system of claim 6 wherein the master control computer control circuit has inputs from each said computer control switch.

8. The system of claim 7 wherein the co-ordinators are AND and inhibit circuits and the master control computer control circuit is an inhibit circuit.

9. The system of claim 8 wherein the means to produce an output whenever there is readout of any computer is an OR circuit.

10. A pulse Doppler radar information interrogation system for rapid processing of radar data comprising:

a plurality of banks of electrical filters coupled in parallel to a radar receiving system, each of said banks containing a plurality of frequency-sensitive bandpass filters for separation of significant information obtained from said receiving system;

a plurality of sequential sampling control circuits, one each thereof being coupled to an associated one of said banks of electrical filters;

a master counter interrogation synchronizing circuit having an output coupled in parallel to each of said sequential sampling control circuits to enable said sampling control circuits to serially interrogate said frequency-sensitive bandpass filters within each of said banks while said banks are being interrogated in parallel with respect to one another; and a master computing means having therein individual counting and totalizing means coupled to each of said sequential sampling control circuits for receiving and totalizing information interrogated from said bandpass filters in each of said filter banks and having output means for providing signals indicative of the totalization of said information, together with signals indicating which of said filter banks originated that particular bit of said totalized information, to other utilization equipment.

References Cited

UNITED STATES PATENTS

| | | | |
|---|---|---|---|
| 2,678,382 | 5/1954 | Horn et al. | 325—31 |
| 2,957,046 | 10/1960 | Freeman et al. | 179—2 |

RICHARD A. FARLEY, *Primary Examiner.*

CHARLES E. WANDS, *Assistant Examiner.*

U.S. Cl. X.R.

340—171